United States Patent
Kaneda

(10) Patent No.: US 9,426,375 B2
(45) Date of Patent: Aug. 23, 2016

(54) LINE-OF-SIGHT DETECTION APPARATUS AND IMAGE CAPTURING APPARATUS

(71) Applicant: CANON KABUSHIKI KAISHA, Tokyo (JP)

(72) Inventor: Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/221,804

(22) Filed: Mar. 21, 2014

(65) Prior Publication Data

US 2014/0285683 A1 Sep. 25, 2014

(30) Foreign Application Priority Data

Mar. 22, 2013 (JP) .................... 2013-060585

(51) Int. Cl.
*H04N 5/235* (2006.01)
*G06K 9/00* (2006.01)

(52) U.S. Cl.
CPC ............ *H04N 5/2351* (2013.01); *G06K 9/0061* (2013.01)

(58) Field of Classification Search
CPC . H04N 5/235; H04N 5/2351; H04N 13/0484; H04N 13/0456; G06K 9/00597; G06K 9/00604; G06K 9/0061; G06K 9/00617
USPC ...................................... 348/222.1
See application file for complete search history.

(56) References Cited

U.S. PATENT DOCUMENTS

| | | | | |
|---|---|---|---|---|
| 7,246,904 B2* | 7/2007 | Knaan | ..................... | A61B 3/113 351/206 |
| 8,761,459 B2* | 6/2014 | Kaneda | .............. | G06K 9/00597 382/117 |
| 8,885,882 B1* | 11/2014 | Yin | ........................... | G06F 3/00 382/103 |
| 9,148,537 B1* | 9/2015 | Currey | ............... | H04N 1/00458 |

(Continued)

FOREIGN PATENT DOCUMENTS

| | | |
|---|---|---|
| JP | 2007-265367 A | 10/2007 |
| JP | 2009-059257 A | 3/2009 |

OTHER PUBLICATIONS

"Statistical Learning Theory," AT&T Labs-Research, London University, John Wiley & Sons, Inc., p. 20-425, 1998.

(Continued)

*Primary Examiner* — Pritham Prabhakher
(74) *Attorney, Agent, or Firm* — Canon USA, Inc. I.P. Division

(57) ABSTRACT

A line-of-sight detection apparatus is configured to calculate a mean luminance value in an eye area of a face image, determine that an object is a person whose iris area is blue or green in a case in which the calculated mean luminance value is equal to or greater than a predetermined value, determine a correction parameter for correcting the eye area based on the determined color of the iris area, and generate a luminance image in which the eye area is corrected by using the determined correction parameter. Thus, the line-of-sight detection apparatus detects a line of sight with high accuracy regardless of the color of the iris area.

12 Claims, 20 Drawing Sheets

(56) References Cited

U.S. PATENT DOCUMENTS

| | | | | |
|---|---|---|---|---|
| 2007/0230797 | A1* | 10/2007 | Hisanaga | A61B 3/113 382/195 |
| 2008/0239092 | A1* | 10/2008 | Sugino | G06K 9/00281 348/222.1 |
| 2009/0015788 | A1* | 1/2009 | Knaan | A61B 3/113 351/209 |
| 2009/0060291 | A1* | 3/2009 | Ohtani | G06K 9/00281 382/118 |
| 2011/0249868 | A1* | 10/2011 | Tsukizawa | A61B 3/113 382/103 |
| 2012/0033853 | A1* | 2/2012 | Kaneda | G06K 9/00221 382/103 |
| 2012/0170027 | A1* | 7/2012 | Tsukizawa et al. | 356/124 |
| 2012/0177266 | A1* | 7/2012 | Tsukizawa | A61B 3/113 382/128 |
| 2012/0243742 | A1* | 9/2012 | Sato | G06K 9/00288 382/103 |
| 2013/0011012 | A1* | 1/2013 | Yonaha | G06K 9/6257 382/103 |

OTHER PUBLICATIONS

"Rapid Object Detection using a Boosted Cascade of Simple Features," in Proc. of CVPR, vol. 1, pp. 511-518, Dec. 2001.

Timothy F. Cootes, Gareth J. Edwards, and Christopher J. Taylor, "Active Appearance Models," IEEE Transactions on Pattern Analysis and Machine Intelligence, vol. 23, No. 6, Jun. 2001.

C. Shan and T. Gritti, "Learning Discriminative LBP-Histogram Bins for Facial Expression Recognition," In Proc. British Machine Vision. Conference, 2008.

Dalal and Triggs, "Histograms of Oriented Gradients for Human Detection," Proceedings of the IEEE Conference on Computer Vision and Pattern Recognition, 2005.

* cited by examiner

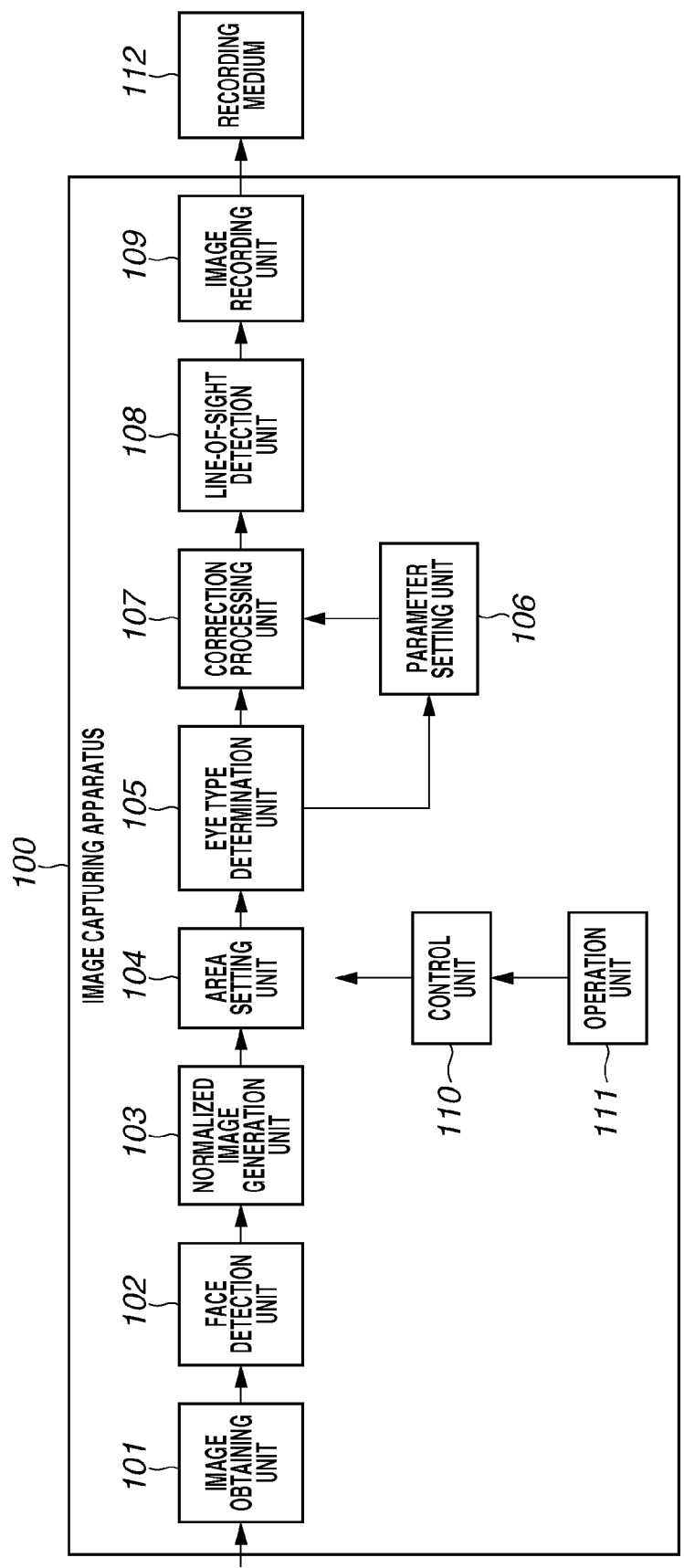

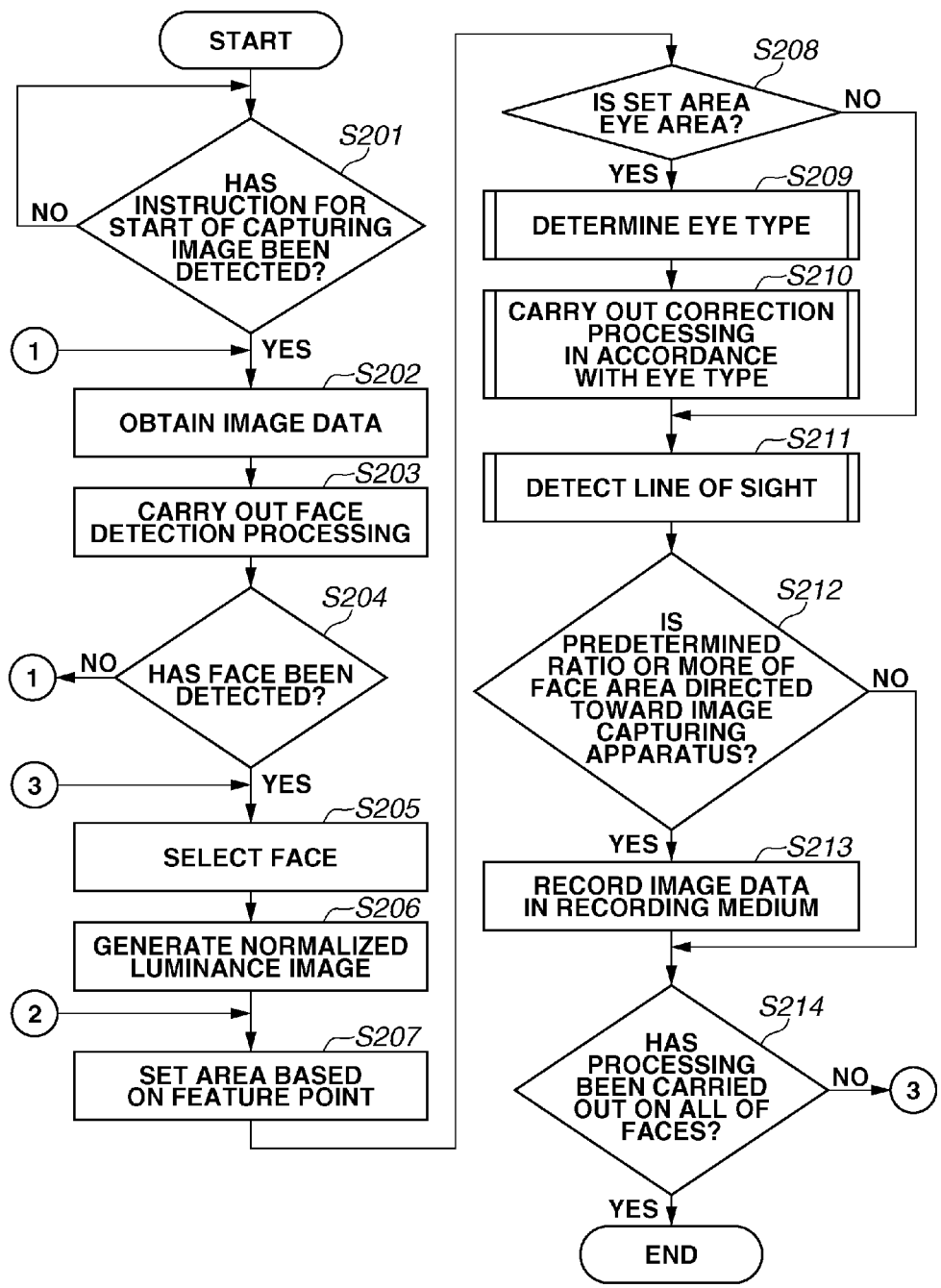

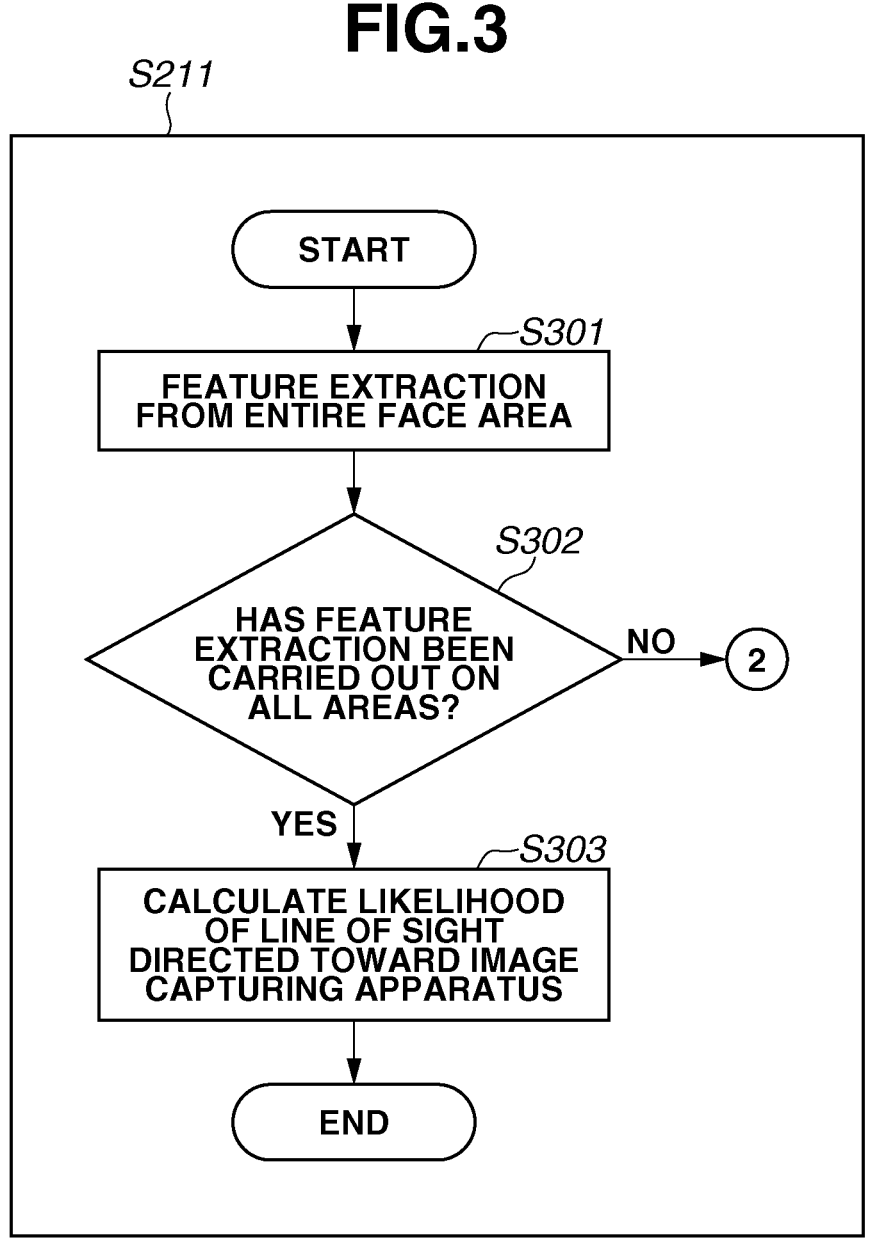

FIG.9
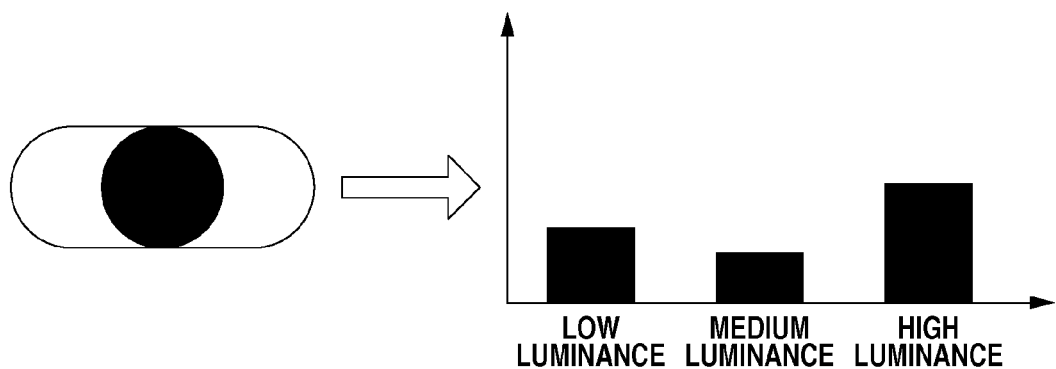
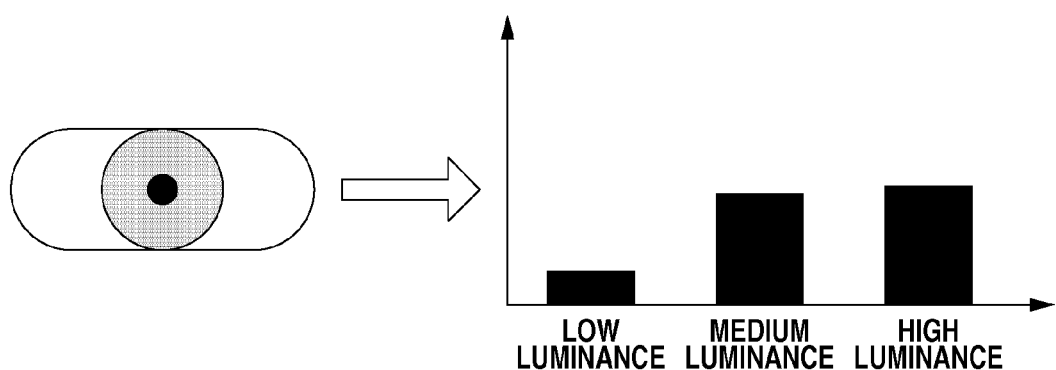

FIG.10
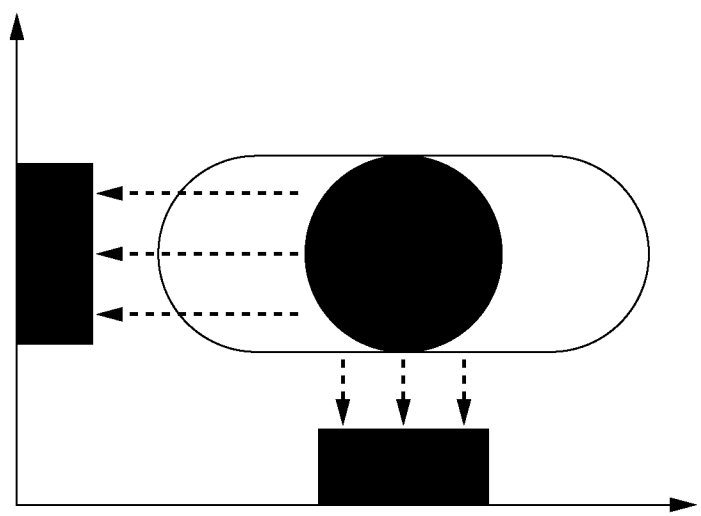
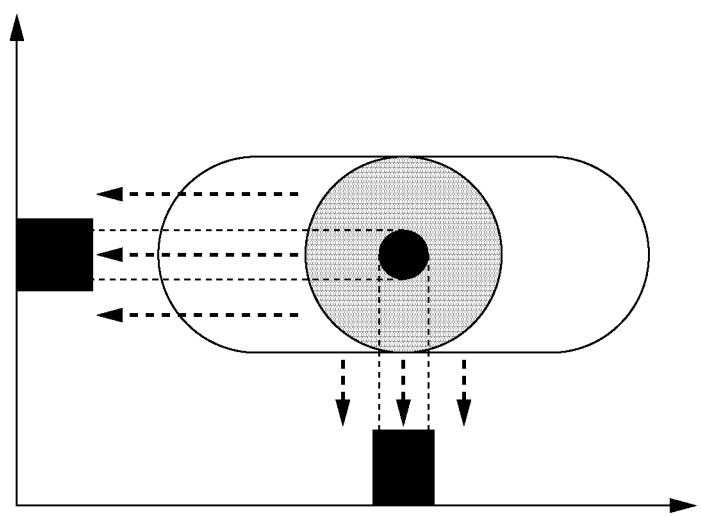

FIG.12
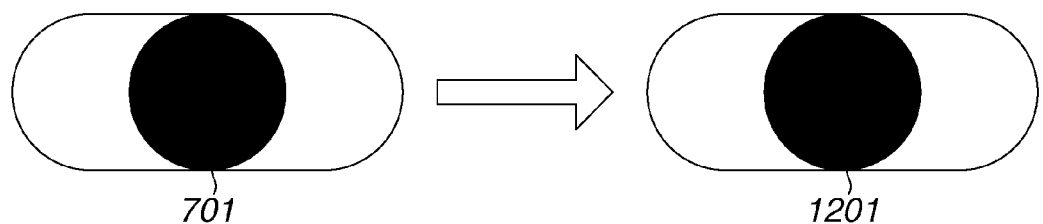
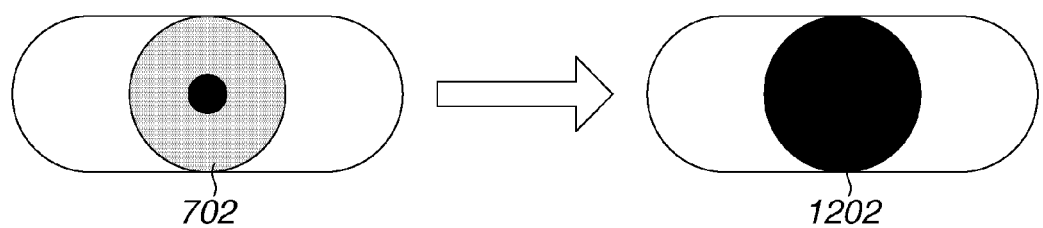

FIG.14

|  | THRESHOLD VALUE Th1 | THRESHOLD VALUE Th2 |
|---|---|---|
| BLUE, GREEN | a1 | a2 |
| BROWN, BLACK | b1 | b2 |

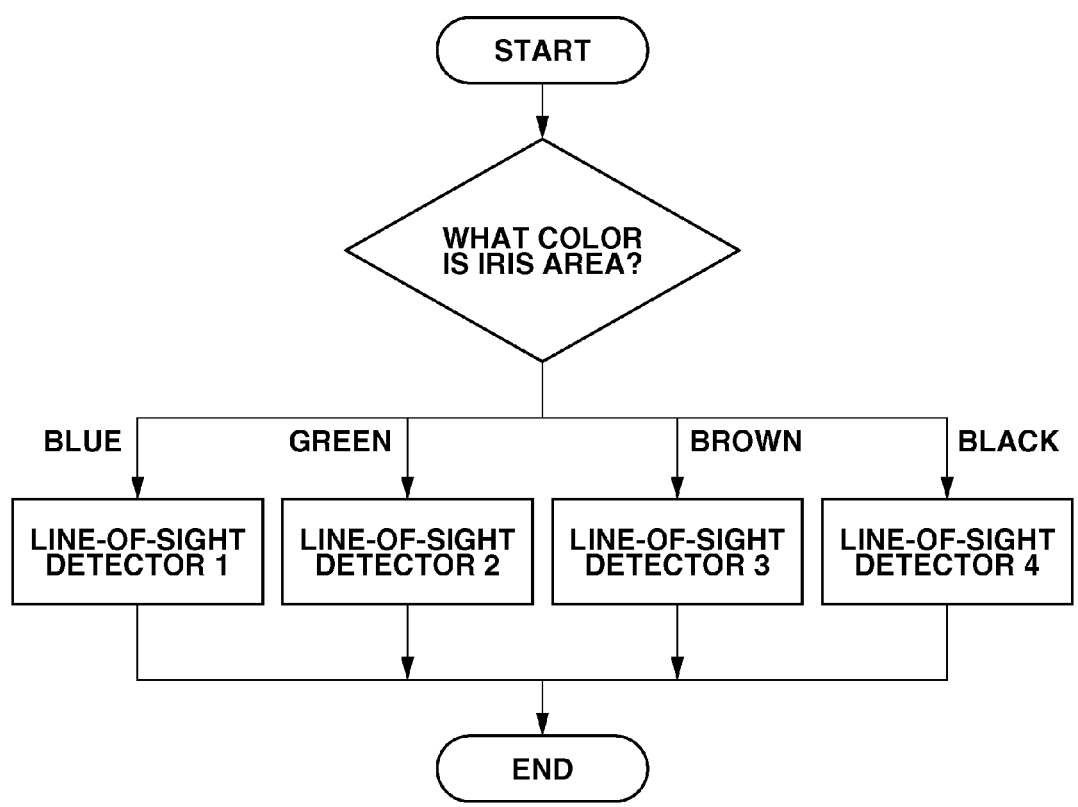

(1)

LINE-OF-SIGHT DETECTION APPARATUS AND IMAGE CAPTURING APPARATUS

BACKGROUND OF THE INVENTION

1. Field of the Invention

The present invention relates to line-of-sight detection apparatuses, image capturing apparatuses, line-of-sight detection methods, and methods for controlling image capturing apparatuses. In particular, the present invention relates to a technique that is suitably used to detect a line of sight of eyes of a variety of colors.

2. Description of the Related Art

To date, a technique for extracting, from an image containing a face of a person, a face area and analyzing the extracted face area to recognize an attribute thereof is known. By applying such a technique to an image capturing apparatus, a face image can be recorded at a timing at which a person to be captured by the image capturing apparatus smiles or a face image can be recorded at a timing at which the line of sight of the person is directed toward the image capturing apparatus. Thus, the aforementioned technique is very useful.

For example, a method discussed in Japanese Patent Application Laid-Open No. 2007-265367 is known as a technique for estimating a direction of a line of sight based on a face image. This method is referred to as a feature point based method in which feature points such as an eye and a mouth are detected from a face image and the direction of the line of sight is estimated by using the distance between the feature points. Meanwhile, as in a method discussed in Japanese Patent Application Laid-Open No. 2009-59257, a so-called appearance based method is also known in which the direction of the line of sight is estimated directly from a face image without detecting feature points.

When the feature point based method is employed, in order to detect a line of sight of a person with high accuracy, in particular, the position of a pupil (or iris and pupil) area within an eye area needs to be accurately detected. Meanwhile, when the appearance based method is employed, a feature amount such as an edge of a pupil area within an eye area needs to be accurately detected.

The color of an iris area within a pupil can, however, be green, blue, brown, black, and so on depending on a person, and thus various luminance patterns are generated depending on a person. Such luminance patterns can be roughly classified into two types, namely a type in which a distribution of luminance values within a pupil area is small as in a black-colored pupil and the other type in which a distribution of luminance values within a pupil area is large, for example, in a light-colored pupil such as a blue-colored pupil. In this manner, since there are various luminance patterns depending on a person, when a line of sight of a person is to be detected by using the feature point based method, a centroid position in the pupil area may deviate from each other, and thus the accuracy of detecting the line of sight may degrade. Meanwhile, if a line of sight of a person is to be detected by using the appearance based method, a feature amount in the pupil area may vary, and thus the accuracy of detecting the line of sight may degrade in a similar manner.

SUMMARY OF THE INVENTION

The present invention is directed to enabling a line of sight to be detected with high accuracy regardless of a color of an iris area within a pupil area.

According to an aspect of the present invention, a line-of-sight detection apparatus includes an obtaining unit configured to obtain a face image, an area setting unit configured to set an eye area in the face image obtained by the obtaining unit, a determination unit configured to determine an eye type of the eye area set by the area setting unit, a parameter setting unit configured to set a correction parameter for the eye area based on the eye type determined by the determination unit, a generation unit configured to generate a luminance image in which the eye area has been corrected based on the correction parameter, and a line-of-sight detection unit configured to detect a line of sight of a face in the face image, from the eye area of the luminance image generated by the generation unit.

Further features of the present invention will become apparent from the following description of exemplary embodiments with reference to the attached drawings.

BRIEF DESCRIPTION OF THE DRAWINGS

FIG. 1 is a block diagram illustrating an overall configuration example of an image capturing apparatus according to a first exemplary embodiment.

FIG. 2 is a flowchart illustrating an example of an overall processing procedure of the image capturing apparatus according to the first exemplary embodiment.

FIG. 3 is a flowchart illustrating an example of a detailed processing procedure in line-of-sight detection processing.

FIG. 9 is an illustration for describing a histogram of different luminance values.

FIG. 10 is an illustration for describing a projection histogram in X and Y directions.

FIG. 12 is an illustration for describing an eye area of which luminance has been corrected.

FIG. 14 illustrates an example of a table of the correction coefficients Th1 and Th2 to be applied in accordance with a color of an iris area within an eye area.

FIG. 20 is a diagram for describing a procedure for selecting a line-of-sight detector in the third exemplary embodiment.

DESCRIPTION OF THE EMBODIMENTS

Figure 4A:
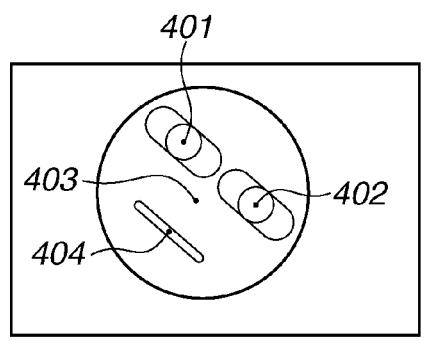
FIGS. 4A and 4B are illustrations for describing center positions of a face, a mouth, and eyes, and a normalized luminance image.

Various exemplary embodiments, features, and aspects of the invention will be described in detail below with reference to the drawings.

Hereinafter, a first exemplary embodiment of the present invention will be described. FIG. 1 is a block diagram illustrating an overall configuration example of an image capturing apparatus 100 according to the first exemplary embodiment. The image capturing apparatus 100 in all or in part operates as a line-of-sight detection apparatus. As illustrated in FIG. 1, the image capturing apparatus 100 includes an image obtaining unit 101, a face detection unit 102, a normalized image generation unit 103, an area setting unit 104, an eye type determination unit 105, a parameter setting unit 106, and a correction processing unit 107. The image capturing apparatus 100 further includes a line-of-sight detection unit 108, an image recording unit 109, a control unit 110 that controls the image capturing apparatus 100 as a whole, and an operation unit 111 that includes a shutter button or the like. In addition, a built-in type or removable type recording medium 112 is attached to the image capturing apparatus 100. According to the first exemplary embodiment, an image of an object is captured at a timing at which the line of sight of the object is directed toward the image capturing apparatus 100.

FIG. 2 is a flowchart illustrating an example of an overall processing procedure of the image capturing apparatus 100 according to the first exemplary embodiment. In step S201, the control unit 110 stands by until the control unit 110 detects an instruction for start of capturing an image, which is given by half-press of the shutter button in the operation unit 111. If the control unit 110 detects an instruction for start of capturing an image (Yes in step S201), the processing proceeds to step S202.

In step S202, the image obtaining unit 101 obtains image data in the form of a digital signal through a light converging element such as a lens, an image sensor such as a complementary metal-oxide semiconductor (CMOS) or a charge-coupled device (CCD) which converts light into an electrical signal, and an analog to digital (AD) converter that converts an analog signal into a digital signal. It is also possible to obtain a face image that has been converted, for example, into a video graphics array (VGA) image (640×480 [pixels]) or a quarter video graphics array (QVGA) image (320×240 [pixels]) through thinning processing or the like.

In step S203, the face detection unit 102 carries out face detection processing on the image data obtained in step S202. In the face detection processing, a face detection method such as the one described in P. Viola, M. Jones, "Rapid Object Detection using a Boosted Cascade of Simple Features," in Proc. Of CVPR, vol. 1, pp. 511-518, December, 2001 can be employed, which is used in the first exemplary embodiment. Through the face detection processing in step S203, information on center coordinates 401 and 402 of right and left eyes, a center coordinate 403 of a face, and a center coordinate 404 of a mouth along an xy plane as illustrated in FIG. 4A is obtained.

In step S204, the face detection unit 102 determines whether a face has been detected through the face detection processing in step S203. If the result of the determination indicates that a face has not been detected (No in step S204), the processing returns to step S202, and another image data is obtained. Meanwhile, if the result of the determination in step S204 indicates that a face has been detected (Yes in step S204), the processing proceeds to step S205. In step S205, the face detection unit 102 selects a face from faces detected in step S203.

Figure 4B:
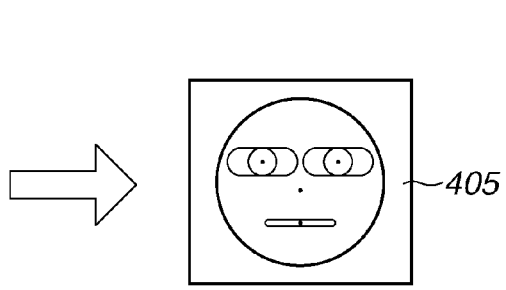

In step S206, the normalized image generation unit 103 generates a normalized luminance image as described below. Specifically, the normalized image generation unit 103 carries out an affine transformation such that the transformed face is upright and has a predetermined size, by using the center coordinates 401 and 402 of the right and left eyes, the center coordinate 403 of the face, and the center coordinate 404 of the mouth illustrated in FIG. 4A, which have been obtained in step S203. Consequently, a normalized luminance image 405 illustrated in FIG. 4B is generated. Here, information on the direction of the face and the direction of the eyes needs to be extracted to detect the line of sight of the object. Therefore, in the first exemplary embodiment, two normalized luminance images, namely one for extracting a feature pertaining to the direction of the face and the other for extracting a feature pertaining to the direction of the eyes, are generated.

In step S207, the area setting unit 104 detects a feature point in one of the two normalized luminance images generated in step S206 and makes an area setting based on the detected feature point. The area setting unit 104 may carry out the processing in step S206 again while using the feature point detected in step S207 and make an area setting again in the normalized luminance image thus obtained.

Figure 5:
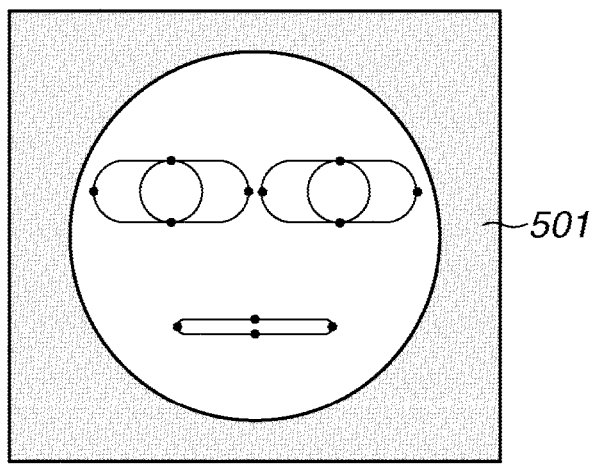
FIG. 5 is an illustration for describing an entire face area.

In detecting a feature point, by using a template prepared in advance for each of the feature points of a face, a position where a correlation with the template becomes highest is checked. As another method, a model based method such as the one described in Timothy F. Cootes, Gareth J. Edwards, and Christopher J. Taylor, "Active Appearance Models," IEEE Transactions on Pattern Analysis and Machine Intelligence, Vol. 23, No. 6, June 2001 may be employed as well. This processing of detecting a feature point is carried out in order to improve the accuracy of the location of the set area, and the feature point detection does not need to be carried out in a case in which the line of sight is to be detected at high speed. In such a case, the area setting unit 104 sets the area by using the center coordinates 401 and 402 of the right and left eyes, the center coordinate 403 of the face, and the center coordinate 404 of the mouth, which are obtained in step S203. In the first exemplary embodiment, a feature pertaining to the direction of the face is extracted, and thus, in step S207, the area setting unit 104 sets an entire face area 501 in the normalized luminance image as illustrated in FIG. 5 based on the result of detecting the feature point.

In step S208, the eye type determination unit 105 determines whether the area set in step S207 corresponds to an eye area. If the result of the determination indicates that the set area corresponds to an eye area (Yes in step S208), the processing proceeds to step S209. If the set area does not correspond to an eye area (No in step S208), the processing proceeds to step S211. In the first exemplary embodiment, the entire face area 501 is set at first as stated above, which does not correspond to an eye area. Therefore, the processing proceeds to step S211 as a result of the initial determination. In step S211, the line-of-sight detection unit 108 detects a line of sight.

FIG. 3 is a flowchart illustrating an example of a detailed processing procedure in the line-of-sight detection processing carried out by the line-of-sight detection unit 108 in step S211. In step S301, the line-of-sight detection unit 108 extracts a feature point from the entire face area 501 set in step S207. For example, the line-of-sight detection unit 108 extracts a feature referred to as a local binary pattern (LBP feature, hereinafter) as described in C. Shan and T. Gritti, "Learning Discriminative LBP-Histogram Bins For Facial Expression Recognition," In Proc. British Machine Vision. Conference, 2008, and then generates a histogram based on the extracted LBP feature. Further, the line-of-sight detection unit 108 may generate a histogram of a luminance gradient as described in Dalal and Triggs, "Histograms of Oriented Gradients for Human Detection," Proceedings of the IEEE Conference on Computer Vision and Pattern Recognition, 2005, or the line-of-sight detection unit 108 may use, instead of a histogram, an LBP feature or a luminance gradient itself.

In step S302, the line-of-sight detection unit 108 determines whether the processing has been completed on the all areas required to detect the line of sight. In order to detect the line of sight of the object, a feature pertaining to the direction of the face and a feature pertaining to the direction of the eyes need to be extracted. In the initial processing, however, only a feature pertaining to the direction of the face is extracted, and thus the processing returns to step S207 to extract a feature pertaining to the direction of the eyes.

Figure 6:
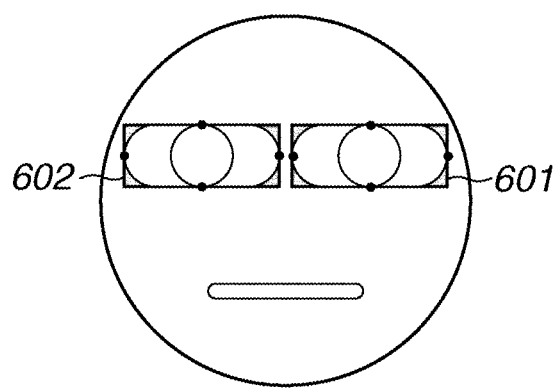
FIG. 6 is an illustration for describing a left eye area and a right eye area to be set.

Returning to step S207, the area setting unit 104 detects a feature point again from another normalized luminance image generated in step S206 and sets a left eye area 601 and a right eye area 602 as illustrated in FIG. 6 based on the detected feature point. In other words, the area setting unit 104 sets the eye areas for the left and right eyes to extract a feature pertaining to the direction of the eyes. Alternatively, the area setting unit 104 may set the eye areas based on the center coordinates 401 and 402 of the right and left eyes, the center coordinate 403 of the face, and the center coordinate 404 of the mouth, which are obtained through the face detection processing in step S203, without detecting a feature point. As another alternative, the area setting unit 104 may set the eye areas based on the result of the detection of the feature point carried out to set the entire face area 501.

When the eye type determination unit 105 determines whether the area set in step S207 corresponds to an eye area in step S208, since the eye areas have been set in the immediately preceding process of step S207, the processing proceeds to step S209. In step S209, the eye type determination unit 105 determines an eye type of the left eye area 601 and the right eye area 602 set in step S207.

Figure 7:
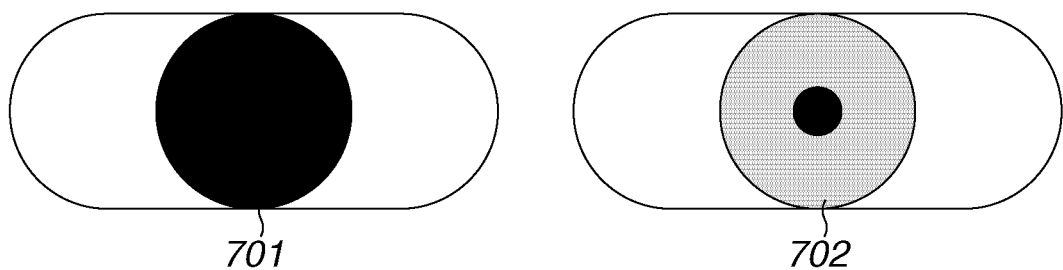
FIG. 7 is an illustration for describing a difference in color of an iris area within an eye area.

FIG. 7 illustrates a luminance image 701 of an eye of a person whose iris area is black and a luminance image 702 of an eye of a person whose iris area is blue or green. When a color image is converted into a luminance image, a luminance distribution in an iris area differs depending on the color of the iris. In detecting a line of sight, it is important to detect, with high accuracy, the direction in which the eye of the object is directed by accurately identifying a pupil area that includes an iris area.

When detecting a line of sight with the use of the feature point based method, however, since a luminance pattern of a pupil area differs depending on the color of the iris area, the accuracy of detecting the position of the pupil area decreases, and thus the accuracy of detecting the line of sight may decrease. In the meantime, when detecting a line of sight with the use of the appearance based method, different feature patterns are generated for different colors of the iris area, and as a result, the accuracy of detecting the line of sight may decrease. The first exemplary embodiment resolves such a problem occurring due to the colors of the iris area. Hereinafter, the determination of an eye type will be described in detail.

Figure 8:
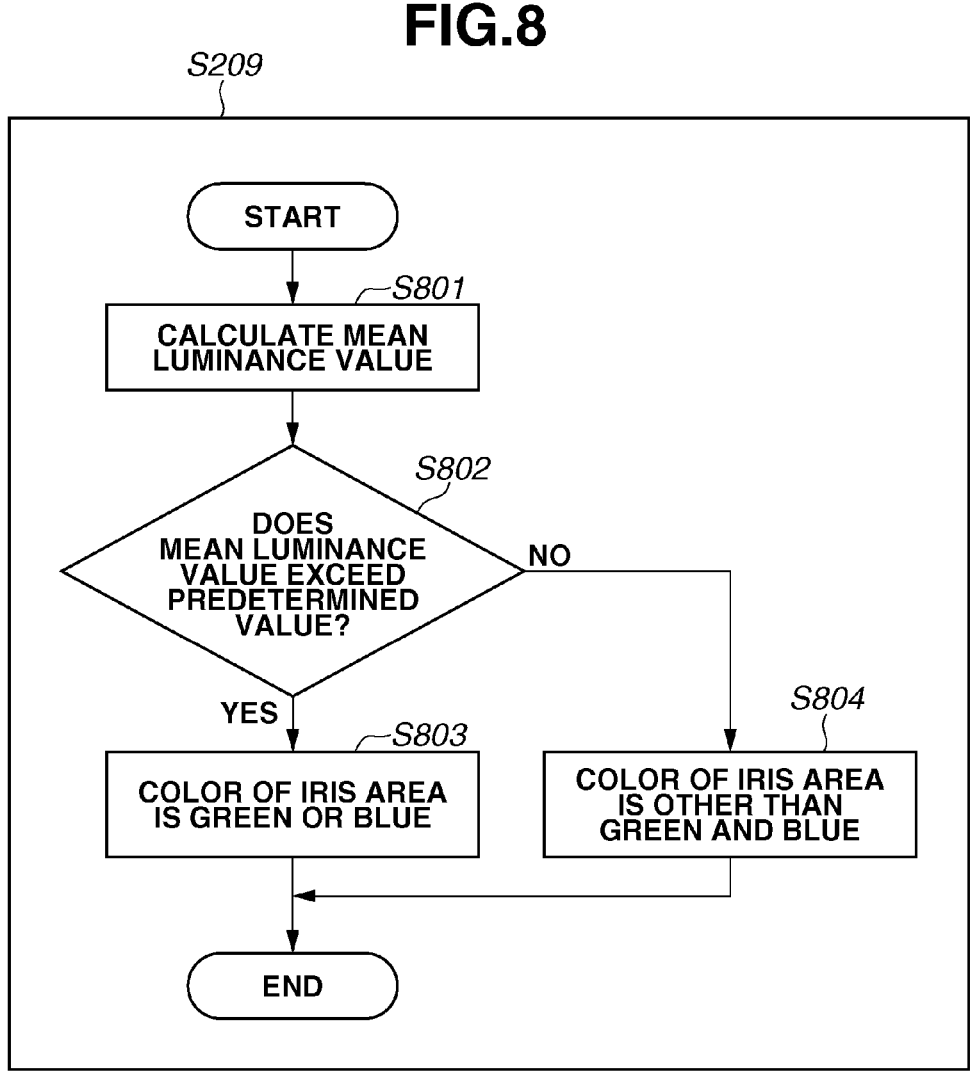
FIG. 8 is a flowchart illustrating an example of a detailed processing procedure in eye type determination processing.

FIG. 8 is a flowchart illustrating an example of a detailed processing procedure in the eye type determination processing carried out by the eye type determination unit 105 in step S209. In step S801, the eye type determination unit 105 calculates data such as a mean luminance value to determine an eye type of the left eye area 601 and the right eye area 602 set in step S207. Specifically, as indicated by the luminance image 701 of a person whose iris area is black and the luminance image 702 of a person whose iris area is blue or green illustrated in FIG. 7, a luminance value in an iris area differs depending on the color of the iris. Based on this difference, the eye type determination unit 105 determines whether the object is a person whose iris area is blue and green. Although a mean luminance value is used as an index for determining the eye type in the first exemplary embodiment, the sum of the luminance values may instead be used.

In step S802, the eye type determination unit 105 determines whether the mean luminance value calculated in step S801 is greater than a predetermined value. The predetermined value used here can be set by analyzing a large amount of data in advance. If the result of the determination in step S802 indicates that the mean luminance value is greater than the predetermined value (Yes in step S802), in step S803, the eye type determination unit 105 determines that the object is a person whose iris area is one of blue and green. Meanwhile, if the mean luminance value is equal to or smaller than the predetermined value (No in step S802), in step S804, the eye type determination unit 105 determines that the object is not a person whose iris area is blue or green.

In the above description, the area setting unit 104 sets the eye areas in the normalized luminance image, and the eye type determination unit 105 determines whether the object is a person whose iris area is blue or green. The determination, however, does not need to be made based on the normalized luminance image, and the eye type determination unit 105 may determine based on a color image whether the object is a person whose iris area is blue and green.

Alternatively, the eye type can be determined through the following method. For example, ranges with a low luminance value, a medium luminance value, and a high luminance value may be defined in the eye area set in step S207, and a histogram as illustrated in FIG. 9 may be generated based on these luminance values. The eye type may then be determined based on the frequency of the low luminance value, the medium luminance value, and the high luminance value. As another alternative, after the luminance is subjected to binarization processing, a projection histogram in X and Y directions as illustrated in FIG. 10 may be generated for pixels in a dark portion. The eye type may then be determined based on the width or the height of the histogram. As yet another alternative, in a case in which color information can be used, an RGB color histogram may be generated for the eye area set in step S207, and the eye type may then be determined by using this color histogram. The use of the color histogram allows the blue-colored and green-colored irises to be finely differentiated.

Referring back to FIG. 2, when the eye type is determined, in step S210, correction processing is carried out based on the result of the determination in step S209.

Figure 11:
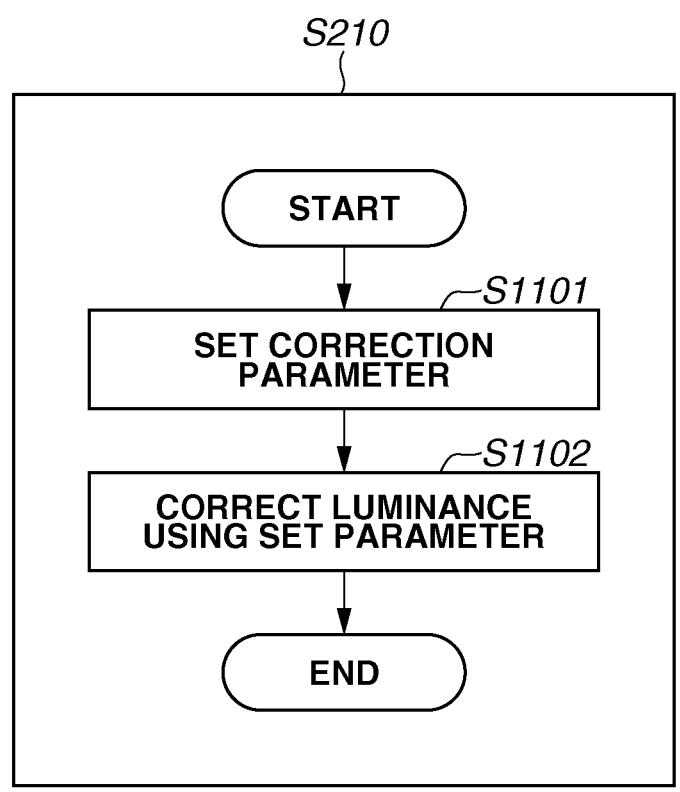
FIG. 11 is a flowchart illustrating an example of a detailed processing procedure in correction processing in accordance with an eye type.

FIG. 11 is a flowchart illustrating an example of a detailed procedure in the correction processing in accordance with an eye type, which is carried out in step S210. In step S1101, the parameter setting unit 106 sets a parameter pertaining to the correction processing based on the eye type determined in step S209. The parameter setting unit 106 sets the parameter pertaining to the correction processing such that a luminance image of an eyes has an identical luminance distribution regardless of the color of the iris area, as in luminance images 1201 and 1202 illustrated in FIG. 12.

Figure 13:
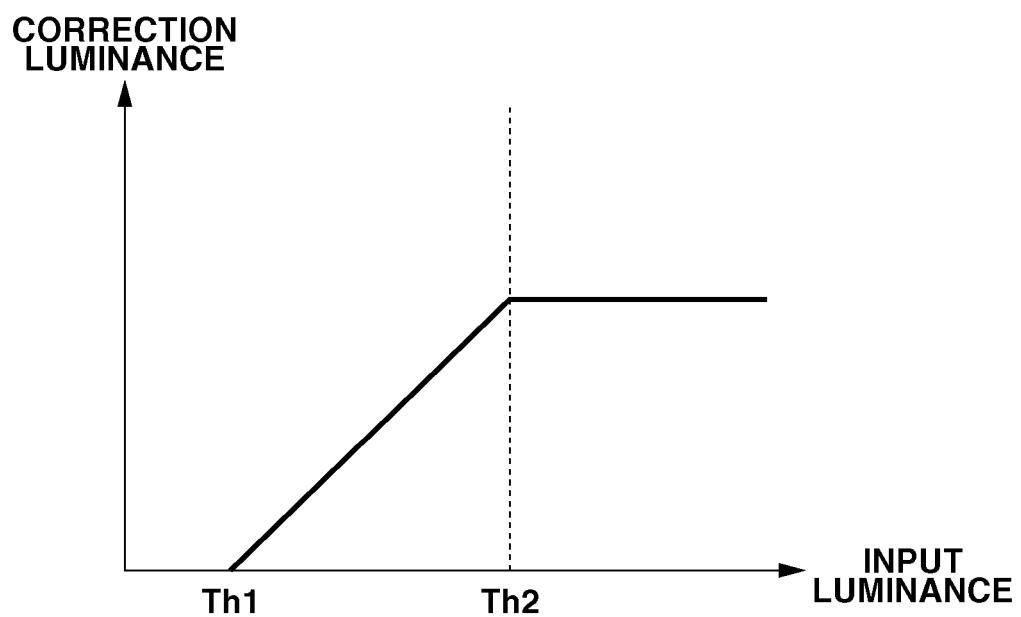
FIG. 13 is an illustration for describing a relationship between correction coefficients Th1 and Th2.

Here, the parameter pertaining to the correction processing refers to, for example, correction coefficients Th1 and Th2 in a function for correcting the luminance as illustrated in FIG. 13. In addition, FIG. 14 illustrates an example of a table of the correction coefficients Th1 and Th2 to be set in accordance with the color of the iris area, and the correction coefficients Th1 and Th2 are set such that a relationship a1>b1 or a2>b2 is satisfied. Although a linear function as illustrated in FIG. 13 is described in the first exemplary embodiment, a method that uses a non-linear function such as a gamma function may instead be used.

In step S1102, the correction processing unit 107 corrects the luminance using the parameter set in step S1101 and generates a luminance image of an eye which has an identical luminance distribution regardless of the color of the iris area. When the correction processing in accordance with the eye type is completed in step S210 in this manner, the processing proceeds to step S211.

Referring back to FIG. 3, in step S301, the line-of-sight detection unit 108 extracts features from the left eye area 601 and the right eye area 602 in a manner similar to extracting the feature from the face area. Since the correction processing in accordance with the color of the iris area has been carried out in step S1102, a feature that does not depend on the color of the iris area is extracted.

In step S302, the line-of-sight detection unit 108 determines whether the processing has been completed on the all areas required to detect the line of sight. Since the feature pertaining to the direction of the face and the feature pertaining to the direction of the eyes have been extracted through the processing carried out thus far, as a result of the determination in step S302, the processing proceeds to step S303.

In step S303, the line-of-sight detection unit 108 calculates a likelihood (or a score) that the line of sight of the face selected in step S205 is directed toward the image capturing apparatus 100 by using the features pertaining the direction of the face and the direction of the eyes extracted in step S301. Then, by threshold-processing of the calculated likelihood, the line-of-sight detection unit 108 determines whether the line of sight of the face selected in step S205 is directed toward the image capturing apparatus 100.

The likelihood may be calculated in step S303 by using, for example, a support vector machine (SVM) described in V. Vapnik. "Statistical Learning Theory," John Wiley & Sons, 1998. In other words, the line-of-sight detection unit 108 learns in advance by using a feature group in which lines of sights are directed toward the image capturing apparatus 100 and a feature group in which lines of sights are not directed toward the image capturing apparatus 100 and calculates the likelihood in step S303.

The method for calculating the likelihood in step S303 is not limited to the technique described in V. Vapnik. "Statistical Learning Theory," John Wiley & Sons, 1998, and other techniques may instead be used. In the above description, the line-of-sight detection unit 108 determines whether the line of sight is directed toward the image capturing apparatus 100. Alternatively, for example, the line-of-sight detection unit 108 may calculate likelihoods of a plurality of angles by using a plurality of discriminators, and may output a direction of a line of sight corresponding to a discriminator which has calculated the maximum value, as the direction of the line of sight of the object. Other than that, for example, an angle θ relative to a predetermined axis serving as a reference may be set as a label in the learning, and by calculating a regression function with a set of the label and a feature, an angle of the line of sight may be output.

Referring back to FIG. 2, in step S212, the line-of-sight detection unit 108 determines whether a predetermined ratio or more of the faces among the faces detected in step S203 is directed toward the image capturing apparatus 100. If the result of the determination indicates that the predetermined proportion or more of the faces is directed toward the image capturing apparatus 100 (Yes in step S212), the processing proceeds to step S213. If the result indicates otherwise (No in step S212), the processing proceeds to step S214.

In step S213, the image recording unit 109 records the image data obtained in step S202 after the start of capturing an image has been instructed, in the recording medium 112 such as a memory card and an internal recording device. In step S214, it is determined whether the processing has been completed on all of the faces detected in step S203. If the result of the determination indicates that the processing has not been carried out on all of the faces (No in step S214), the processing returns to step S205. If the processing has been carried out on all of the faces (Yes in step S214), the processing is terminated.

As described above, according to the first exemplary embodiment, the correction processing is carried out after the correction parameter is set based on the result of the determination of the eye type, and the line of sight is then detected. Accordingly, the line of sight can be detected with high accuracy regardless of the color of the iris.

The line of sight is detected through the appearance based method in the first exemplary embodiment. Alternatively, a feature point may be detected by using the luminance image that has been corrected in step S210 of FIG. 2, and the line of sight can then be detected with high accuracy through the feature point based method regardless of the color of the iris.

Figure 15:
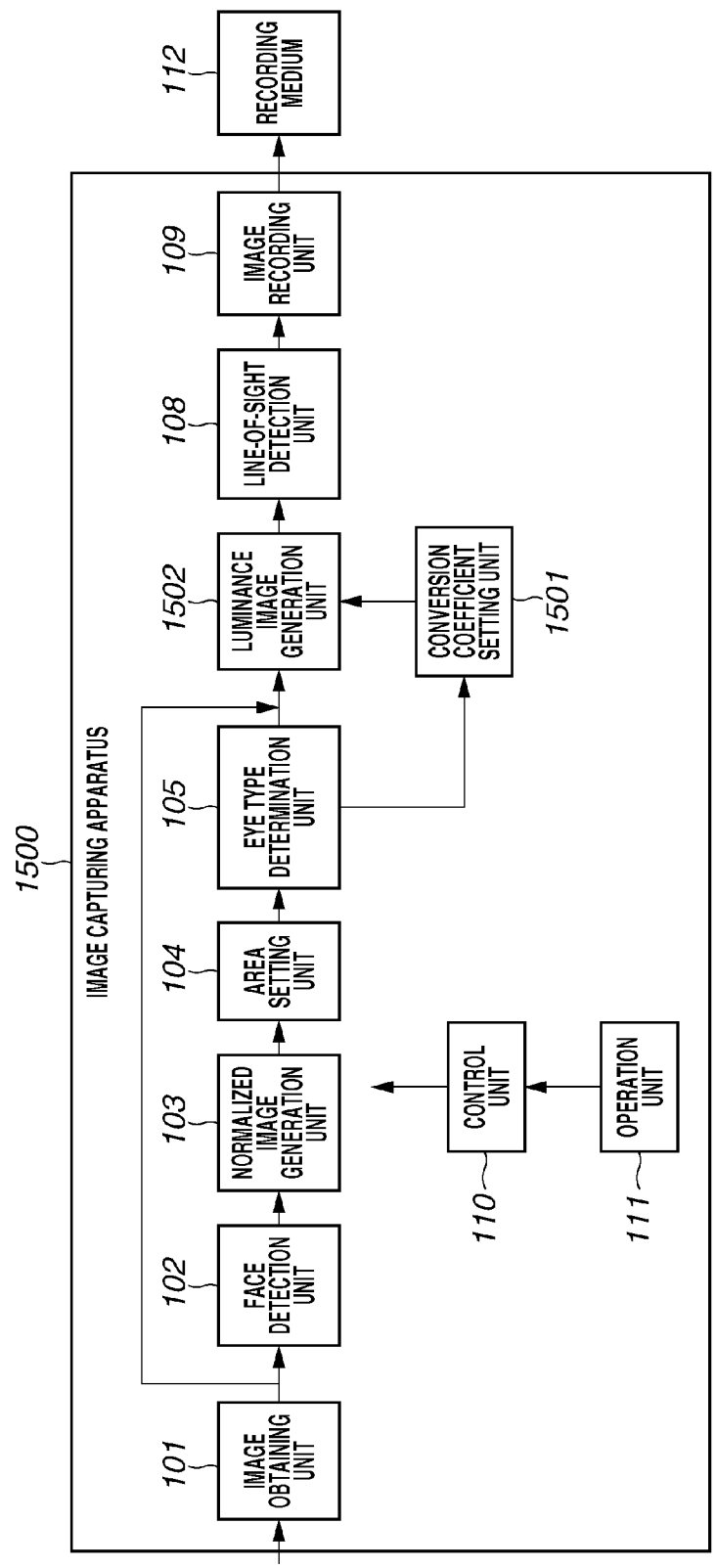
FIG. 15 is a block diagram illustrating an overall configuration example of an image capturing apparatus according to a second exemplary embodiment.

Hereinafter, a second exemplary embodiment of the present invention will be described. FIG. 15 is a block diagram illustrating an overall configuration example of an image capturing apparatus 1500 according to the second exemplary embodiment. The image capturing apparatus 1500 differs from the image capturing apparatus 100 illustrated in FIG. 1 in that the image capturing apparatus 1500 includes a conversion coefficient setting unit 1501 and a luminance image generation unit 1502 in place of the parameter setting unit 106 and the correction processing unit 107. Other configurations are similar to those of the first exemplary embodiment, and thus descriptions thereof will be omitted.

Figure 16:
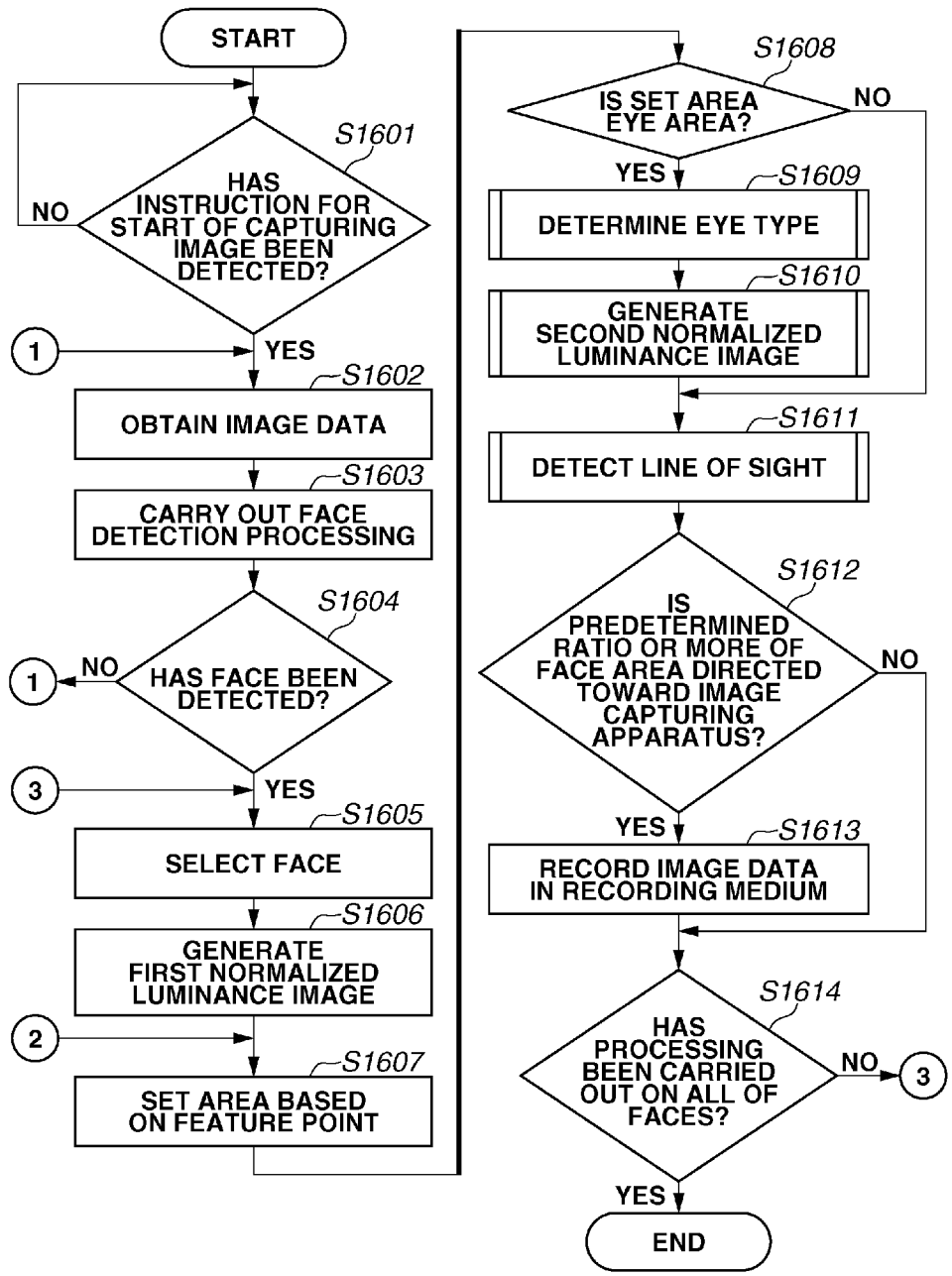
FIG. 16 is a flowchart illustrating an example of an overall processing procedure of the image capturing apparatus according to the second exemplary embodiment.

FIG. 16 is a flowchart illustrating an example of an overall processing procedure of the image capturing apparatus 1500 according to the second exemplary embodiment. Processes in steps S1601 to S1605 are the same as the processes in steps S201 to S205, of FIG. 2 described in the first exemplary embodiment, and thus descriptions thereof will be omitted.

In step S1606, the normalized image generation unit 103 carries out an affine transformation through a procedure similar to that in step S206 described in the first exemplary embodiment to generate a first normalized luminance image.

In step S1607, the area setting unit 104 detects a feature point in the first normalized luminance image and makes an area setting based on the detected feature point. At first, as in the first exemplary embodiment, the area setting unit 104 converts the center coordinates 401 and 402 of the right and left eyes, the center coordinate 403 of the face, and the center coordinate 404 of the mouth into a coordinate system of the first normalized luminance image generated in step S1606 and then sets the entire face area 501.

In step S1608, the eye type determination unit 105 determines whether the area set in step S1607 corresponds to an eye area. If the result of the determination indicates that the set area corresponds to an eye area (Yes in step S1608), the processing proceeds to step S1609. If the set area does not correspond to an eye area (No in step S1608), the processing proceeds to step S1611. As stated above, the entire face area has been set at first, and does not correspond to an eye area. Thus, the processing proceeds to step S1611 in an initial the determination. In step S1611, the line-of-sight detection unit 108 detects a line of sight. In step S1611, a feature is extracted from the entire face area at first as in the first exemplary embodiment, and the processing returns to step S1607. The procedure here is similar to the procedure illustrated in FIG. 3 in the first exemplary embodiment, and thus detailed descriptions thereof will be omitted.

Then, again in step S1607, the area setting unit 104 converts the center coordinates 401 and 402 of the right and left eyes, the center coordinate 403 of the face, and the center coordinate 404 of the mouth into a coordinate system of a color image, based on which the normalized luminance image is generated, and sets the eye area. Since the eye area has been set in the immediately preceding process of step S1607, as a result of the determination in step S1608, the processing proceeds to step S1609. The procedure in step S1609, is similar to the procedure in FIG. 8 described in the first exemplary embodiment, and thus detailed description thereof will be omitted.

In step S1610, a second normalized luminance image is generated from a color image, based on which the normalized luminance image is generated, according to the result of the determination of the eye type in step S1609.

Figure 17:
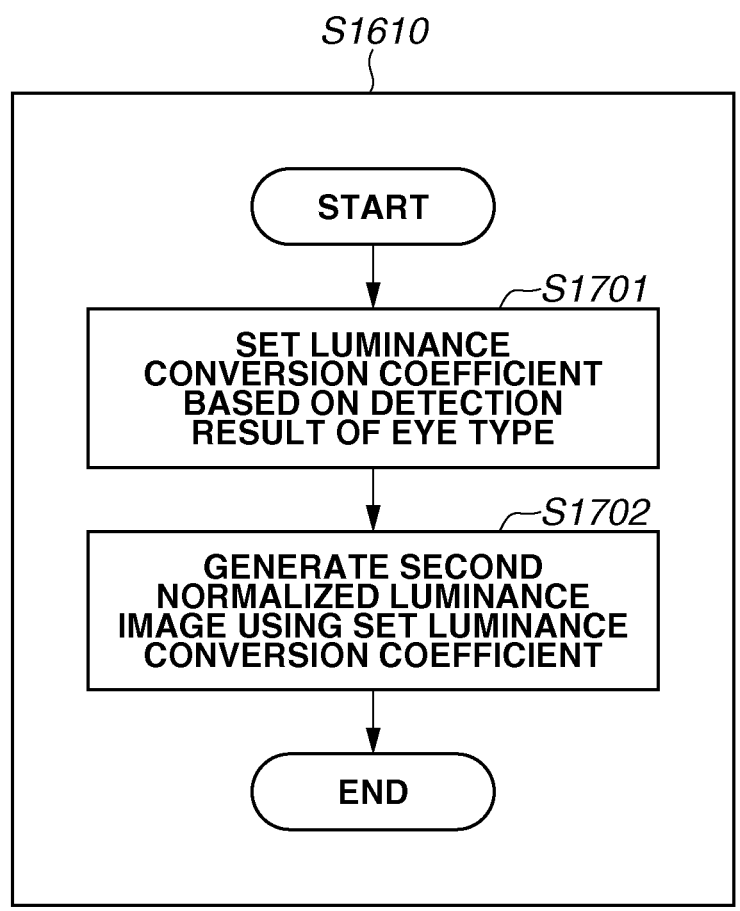
FIG. 17 is a flowchart illustrating an example of a detailed processing procedure in processing for generating a second normalized luminance image.

FIG. 17 is a flowchart illustrating an example of a detailed processing procedure for generating the second normalized luminance image in step S1610. In step S1701, the conversion coefficient setting unit 1501 sets a luminance conversion coefficient based on the result of the determination of the eye type in step S1609. Typically, the following expression and luminance conversion coefficients are used when generating a luminance image from an RGB color image.

$$Y = C1*R + C2*G + C3*B$$

C1=0.299, C2=0.587, C3=0.114

In step S1701 of the second exemplary embodiment, however, the luminance conversion coefficients C1, C2, and C3 are modified in accordance with the result of the determination of the eye type. In other words, for example, the weight of B may be set higher than those of G and R if the iris area is blue, or the weight of G may be set higher than those of B and R if the iris area is green. In this manner, the luminance conversion coefficients C1, C2, and C3 are modified in accordance with the color of the iris area. Through this, a luminance image that is less susceptible to the effect of the color of the iris area can be generated.

In step S1702, the luminance image generation unit 1502 generates the second normalized luminance image by using the luminance conversion coefficients set in step S1701.

Referring back to FIG. 16, in step S1611, the line-of-sight detection unit 108 detects the line of sight by using the second normalized luminance image through a procedure that is similar to the procedure in FIG. 3, and thus the line-of-sight detection unit 108 can detect the line of sight with high accuracy. Processes in steps S1612 to S1614 are similar to the processes in steps S212 to S214 of FIG. 2, and thus descriptions thereof will be omitted.

As described above, according to the second exemplary embodiment, the luminance conversion coefficients are modified based on the result of the determination of the eye type and the luminance image is then generated. Accordingly, the line of sight can be detected with high accuracy regardless of the color of the iris.

Figure 18:
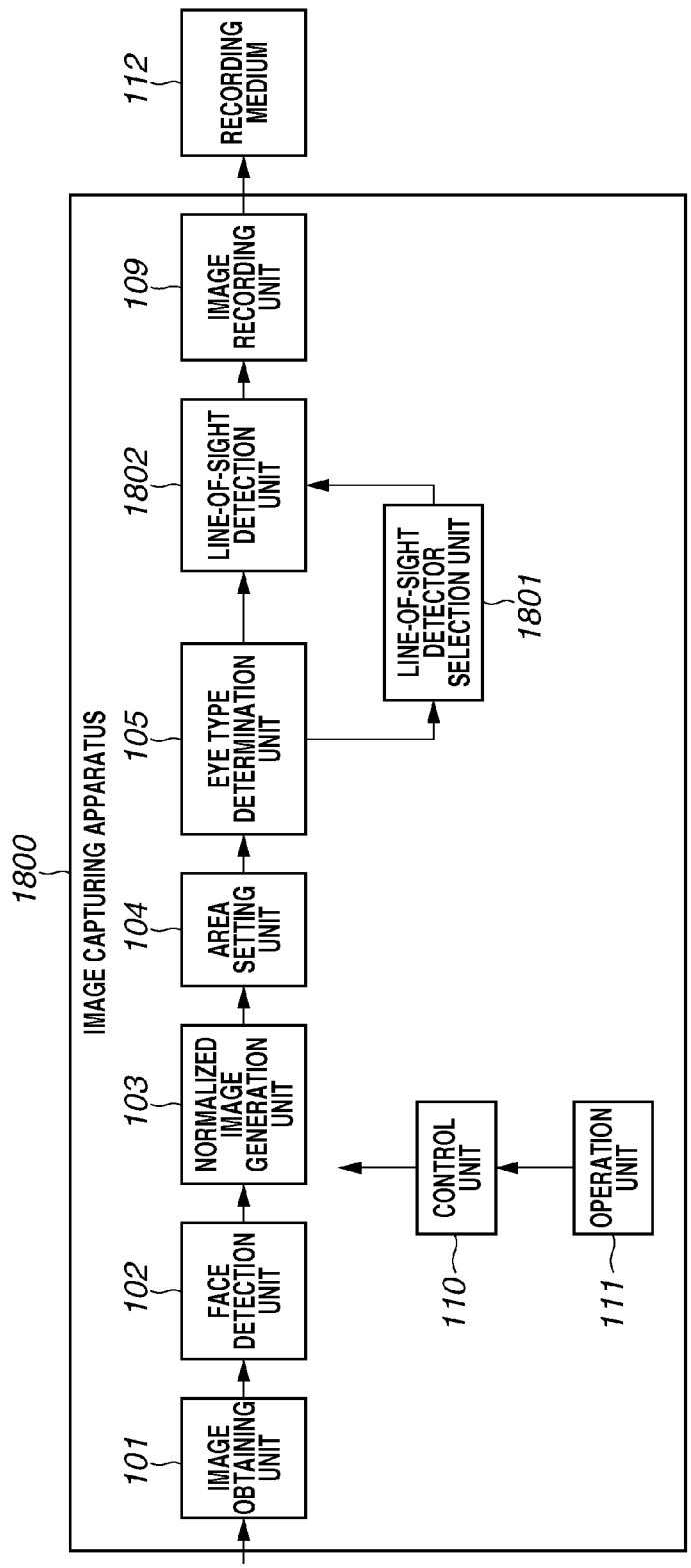
FIG. 18 is a block diagram illustrating an overall configuration example of an image capturing apparatus according to a third exemplary embodiment.

Hereinafter, a third exemplary embodiment for embodying the present invention will be described. FIG. 18 is a block diagram illustrating an overall configuration example of an image capturing apparatus 1800 according to the third exemplary embodiment. The image capturing apparatus 1800 differs from the image capturing apparatus 100 illustrated in FIG. 1 in that the parameter setting unit 106, the correction processing unit 107, and the line-of-sight detection unit 108 are replaced with a line-of-sight detector selection unit 1801 and a line-of-sight detection unit 1802. Other configurations are similar to those of the first exemplary embodiment, and thus descriptions thereof will be omitted.

Figure 19:
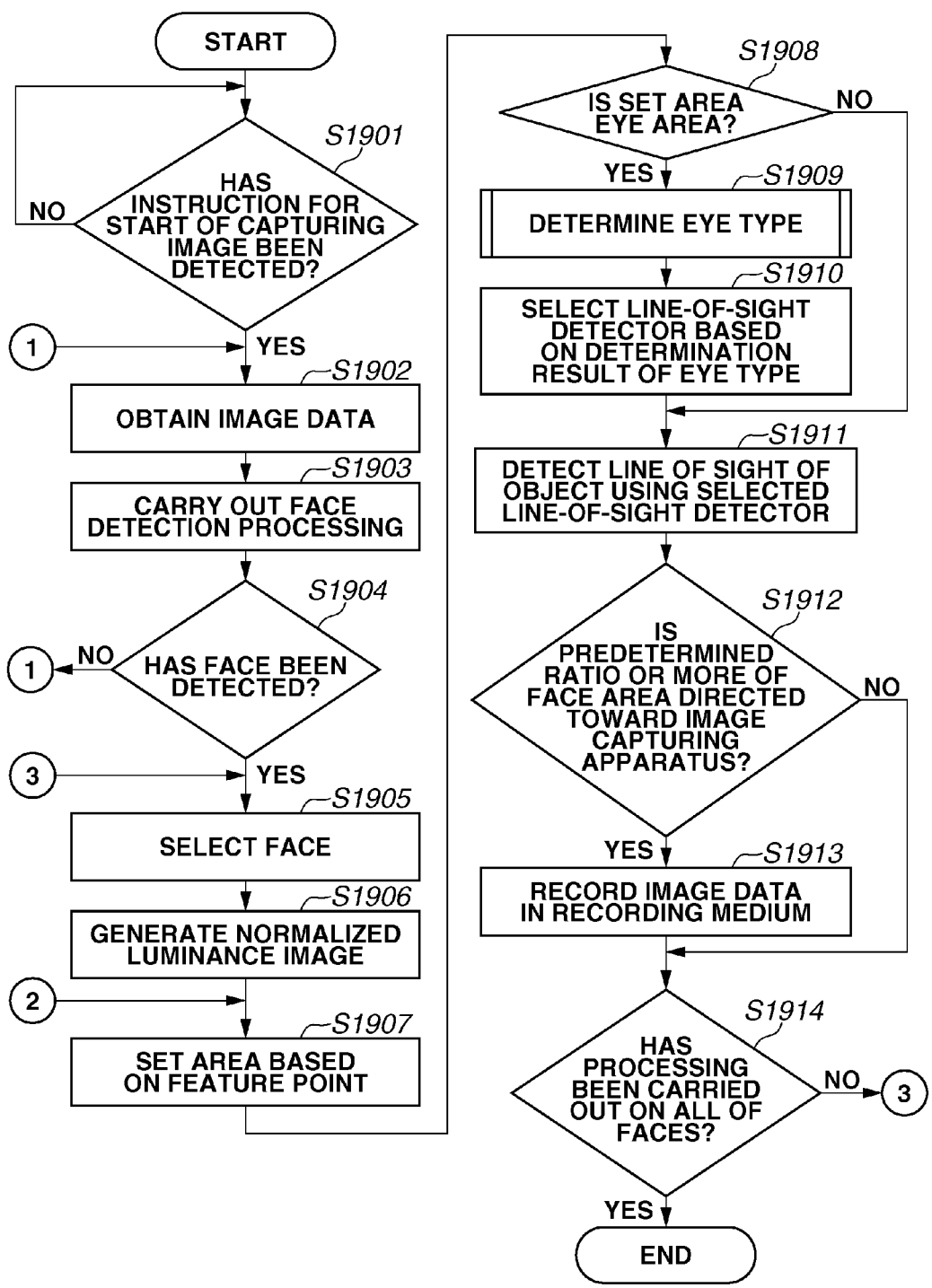
FIG. 19 is a flowchart illustrating an example of an overall processing procedure of the image capturing apparatus according to the third exemplary embodiment.

FIG. 19 is a flowchart illustrating an example of an overall processing procedure of the image capturing apparatus 1800 according to the third exemplary embodiment. Processes in steps S1901 to S1909 and steps S1912 to S1914 are the same as the processes in steps S201 to S209 and steps S212 to S214 of FIG. 2 described in the first exemplary embodiment, and thus descriptions thereof will be omitted. In addition, the eye area is set through a procedure similar to that in the first exemplary embodiment, and the eye type is thus determined.

In step S1910, the line-of-sight detector selection unit 1801 selects a line-of-sight detector to be used to detect a line of sight, based on the result of the determination of the eye type in step S1909. In the first exemplary embodiment, the correction processing has been carried out on the generated luminance image, and in the second exemplary embodiment, the luminance conversion coefficients used when generating the luminance image have been modified. Thus, the luminance image that does not depend on the color of the iris has been generated. In the meantime, in the third exemplary embodiment, line-of-sight detectors are prepared in accordance with the colors of the iris, and the line-of-sight detector selection unit 1801 selects one of the line-of-sight detectors based on the result of the determination of the eye type in step S1909. For example, as illustrated in FIG. 20, the colors of the iris area are classified into green, blue, brown, and black, and a line-of-sight detector is prepared for each of the colors. The line-of-sight detector selection unit 1801 then selects a line-of-sight detector based on the color of the iris, and in step S1911, the line-of-sight detection unit 1802 detects the line of sight of the object by using the line-of-sight detector selected in step S1910.

As described above, according to the third exemplary embodiment, a line-of-sight detector is selected based on the result of the determination of the eye type. Thus, the line of sight can be detected with high accuracy regardless of the color of the iris.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-060585 filed Mar. 22, 2013, which is hereby incorporated by reference herein in its entirety.

What is claimed is:

1. A line-of-sight detection apparatus, comprising:
an image sensor configured to obtain a face image;
a memory;
a processor in communication with the memory, configured to control:
an area setting unit configured to set an eye area in the face image obtained by the obtaining unit;
a determination unit configured to determine an eye type of the eye area set by the area setting unit;
a correction unit configured to correct luminance of the eye area so that a luminance image of eyes has an identical luminance distribution regardless of color of an iris area in the eye area based on the eye type determined by the determination unit;
a feature extraction unit configured to extract a feature of the eye area in which the luminance has been corrected; and
a line-of-sight detection unit configured to detect a line of sight of a face in the face image, based on the feature of the eye area extracted by the feature extraction unit.

2. The line-of-sight detection apparatus according to claim 1, wherein the determination unit determines the eye type by calculating one of a mean luminance value and a sum of luminance values of the eye area.

3. The line-of-sight detection apparatus according to claim 1, wherein the determination unit determines the eye type by using a histogram pertaining to one of a luminance value and a color.

4. The line-of-sight detection apparatus according to claim 1, wherein the line-of-sight detection unit calculates one of a likelihood that the face is directed toward an image capturing apparatus, and an angle relative to a predetermined axis serving as a reference.

5. The line-of-sight detection apparatus according to claim 1, wherein the correction unit comprises:
a parameter setting unit configured to set a correction parameter for correcting luminance of the eye area based on the eye type determined by the determination unit; and
a generation unit configured to generate a luminance image by correcting the luminance of the eye area based on the correction parameter.

6. The line-of-sight detection apparatus according to claim 5,
wherein the correction parameter is a correction coefficient pertaining to luminance correction, and
wherein the generation unit generates the luminance image by correcting luminance of the eye area based on the correction coefficient.

7. The line-of-sight detection apparatus according to claim 5,
wherein the correction parameter is a conversion coefficient for converting a color image into the luminance image, and
wherein the generation unit generates the luminance image based on the conversion coefficient.

8. An image capturing apparatus, comprising:
an image sensor configured to capture an image of an object to obtain a face image of the object;
a memory;
a processor in communication with the memory, configured to control:
an area setting unit configured to set an eye area in the face image obtained by the obtaining unit;
a determination unit configured to determine an eye type of the eye area set by the area setting unit;
a correction unit configured to correct luminance of the eye area so that a luminance image of eyes has an identical luminance distribution regardless of color of an iris area in the eye area based on the eye type determined by the determination unit;
a feature extraction unit configured to extract a feature of the eye area in which the luminance has been corrected;
a line-of-sight detection unit configured to detect a line of sight of a face in the face image, based on the feature of the eye area extracted by the feature extraction unit; and
a recording unit configured to record the face image in which the line of sight of the face has been detected by the line-of-sight detection unit, in a recording medium.

9. A line-of-sight detection method, comprising:
obtaining a face image using an image sensor;
setting, by a processor, an eye area in the face image obtained in the obtaining;
determining, by the processor, an eye type of the eye area set in the setting of the eye area;
correcting, by the processor, luminance of the eye area so that a luminance image of eves has an identical luminance distribution regardless of color of an iris area in the eve area based on the eye type determined in the determining;
extracting, by the processor, a feature of the eye area in which the luminance has been corrected; and
detecting, by the processor, a line of sight of a face in the face image based on the feature of the eye area extracted.

10. A method for controlling an image capturing apparatus, the method comprising:
capturing, using an image sensor, an image of an object to obtain a face image of the object;
setting, by a processor, an eye area in the obtained face image;
determining, by the processor, an eye type of the set eye area;
correcting, by the processor, luminance of the eye area so that a luminance image of eyes has an identical luminance distribution regardless of color of an iris area in the eve area based on the eye type determined in the determining;
extracting, by the processor, a feature of the eye area in which the luminance has been corrected; and
detecting, by the processor, a line of sight of a face in the face image based on the feature of the eye area extracted; and
recording, by the processor, the face image in which the line of sight of the face has been detected, in a recording medium.

11. A non-transitory computer-readable storage medium that stores computer executable instructions for causing a computer to implement a method, the method comprising:
   obtaining a face image using an image sensor;
   setting, by a processor, an eye area in the face image obtained in the obtaining;
   determining, by the processor, an eye type of the eye area set in the setting of the eye area;
   correcting, by the processor, luminance of the eye area so that a luminance image of eyes has an identical luminance distribution regardless of color of an iris area in the eve area based on the eye type determined in the determining;
   extracting, by the processor, a feature of the eye area in which the luminance has been corrected; and
   detecting, by the processor, a line of sight of a face in the face image based on the feature of the eye area extracted.

12. A non-transitory computer-readable storage medium that stores computer executable instructions for causing a computer to implement a method, the method comprising:
   capturing, using an image sensor, an image of an object to obtain a face image of the object;
   setting, by a processor, an eye area in the obtained face image; determining an eye type of the set eye area;
   correcting, by the processor, luminance of the eye area so that a luminance image of eves has an identical luminance distribution regardless of color of an iris area in the eve area based on the eye type determined in the determining;
   extracting, by the processor, a feature of the eye area in which the luminance has been corrected; and detecting a line of sight of a face in the face image based on the feature of the eye area extracted; and recording the face image in which the line of sight of the face has been detected, in a recording medium.

* * * * *